United States Patent
Yamane et al.

(10) Patent No.: US 12,000,813 B2
(45) Date of Patent: Jun. 4, 2024

(54) GAS CHROMATOGRAPH

(71) Applicant: SHIMADZU CORPORATION, Kyoto (JP)

(72) Inventors: Masashi Yamane, Kyoto (JP); Kiyonori Koga, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 171 days.

(21) Appl. No.: 17/781,593

(22) PCT Filed: Feb. 28, 2020

(86) PCT No.: PCT/JP2020/008284
§ 371 (c)(1),
(2) Date: Jun. 1, 2022

(87) PCT Pub. No.: WO2021/171550
PCT Pub. Date: Sep. 2, 2021

(65) Prior Publication Data
US 2023/0003700 A1  Jan. 5, 2023

(51) Int. Cl.
*G01N 30/32* (2006.01)
*G01N 30/54* (2006.01)
*G01N 30/86* (2006.01)

(52) U.S. Cl.
CPC ......... *G01N 30/8658* (2013.01); *G01N 30/32* (2013.01); *G01N 30/54* (2013.01); *G01N 2030/324* (2013.01)

(58) Field of Classification Search
CPC .... G01N 30/8658; G01N 30/32; G01N 30/54; G01N 2030/324
See application file for complete search history.

(56) References Cited

U.S. PATENT DOCUMENTS

2011/0308298 A1* 12/2011 Magni .................... G01N 30/32
73/23.35

FOREIGN PATENT DOCUMENTS

JP          2013044647 A      3/2013

OTHER PUBLICATIONS

Office Action for corresponding application No. CN 202080095532.1 dated Jul. 27, 2023.

* cited by examiner

*Primary Examiner* — Kristina M Deherrera
*Assistant Examiner* — Jean F Morello
(74) *Attorney, Agent, or Firm* — Muir Patent Law, PLLC (57) ABSTRACT

A gas chromatograph is provided with: a sample gas generator; a separation column; a detector; a plurality of gas supply sources; a switching unit; a regulator; and an out-of-gas determination unit. After the out of gas determination unit has determined that the out of gas has occurred in the gas supply source supplying the carrier gas to the sample gas generator, it is configured to perform a column protection operation for changing the gas supply source fluidly connected to the sample gas generator by the switching unit.

8 Claims, 4 Drawing Sheets

GAS CHROMATOGRAPH

TECHNICAL FIELD

The present invention relates to a gas chromatograph.

BACKGROUND ART

A gas chromatograph is configured to transfer a sample gas generated in a sample gas generator to a separation column, separate each component in the sample gas in the separation column, and detect each separated component in a detector. In order to transfer the sample gas generated in the sample gas generator to the separation column, a carrier gas is supplied to the sample gas generator.

In the gas chromatograph, an analysis is performed while controlling the temperature of the separation column. However, if the temperature control of the separation column is stopped during the standby state in which no analysis is performed, it takes a long time to stabilize the temperature of the separation column at a predetermined temperature for the subsequent sample analysis. Therefore, it is a common practice to continuously perform the temperature control of the separation column even during the standby state. On the other hand, when the separation column is temperature-controlled at a high temperature in a state in which no fluid is flowing through the separation column, there is a problem that the deterioration of the stationary phase filled in the separation column is accelerated, thereby shortening the life of the separation column. Therefore, it is a common practice to keep the carrier gas flowing even during the standby state in which no sample analysis is performed.

Helium gas is generally used as the carrier gas, but it is required to reduce the consumption of the helium gas due to an increase in the price of helium gas or the like. For this reason, it has been proposed that one of two gases is selectively supplied to the sample gas generator, a helium gas is used as the carrier gas during the sample analysis, and a gas other than the helium gas, such as, e.g., a nitrogen gas, is used as a column protective gas during the standby state (see Patent Document 1).

PRIOR ART DOCUMENT

Patent Document

Patent Document 1: Japanese Unexamined Patent Application Publication No. 2013-044647

SUMMARY OF THE INVENTION

Problems to be Solved by the Invention

As described above, even in a case where the analysis by the gas chromatograph is in either the analysis state or the standby state, the carrier gas is continuously supplied to the separation column. For this reason, during the standby state between an analysis and the subsequent analysis, during successive analyses at night, etc., there may happen that the gas supply source supplying a carrier gas may run out of gas in a state in which the user is absent. When the out of gas has occurred in the gas supply source supplying the carrier gas, the carrier gas is not supplied to the separation column, and a state in which the separation column is heated to a high temperature occurs in a state in which no fluid flows through the separation column, causing the deterioration of the separation column. Therefore, it is conceivable to stop the temperature control of the separation column at the time point when it is detected that the carrier gas is not supplied to the separation column. However, in such a case, it takes a long time to resume the state in which analysis can be performed.

The present invention has been made in view of the above-described circumstances. The present invention aims to enable rapid return to a condition in which analysis can be performed even in a case where out of gas has occurred in a gas supply source supplying a carrier gas.

Means for Solving the Problem

A gas chromatograph according to the present invention is provided with: a sample gas generator configured to generate a sample gas from an injected sample; a separation column fluidly connected to an outlet of the sample gas generator, the separation column being configured to separate components in the sample gas generated by the sample gas generator; a detector fluidly connected to an outlet of the separation column, the detector being configured to detect the components separated in the separation column; a plurality of gas supply sources each configured to supply a carrier gas for carrying the sample gas generated by the sample gas generator to the separation column; a switching unit fluidly connected to the plurality of gas supply sources, the switching unit being configured to switch such that one of the plurality of gas supply sources is fluidly connected to the sample gas generator; a regulator interposed between the switching unit and the sample gas generator, the regulator being configured to regulate a gas supply pressure from the gas supply source and/or a gas supply flow rate to the sample gas generator while detecting the gas supply source and/or the gas supply flow rate; and an out-of-gas determination unit configured to determine whether or not out of gas has occurred in the gas supply source supplying the carrier gas to the sample gas generator, based on the gas supply pressure or the gas supply flow rate. After the out of gas determination unit has determined that the out of gas has occurred in the gas supply source supplying the carrier gas to the sample gas generator, it is configured to perform a column protection operation for changing the gas supply source fluidly connected to the sample gas generator by the switching unit.

Effects of the Invention

In the gas chromatograph according to the present invention, it is provided with an out of gas determination unit configured to determine whether or not out of gas has occurred in the gas supply source supplying the carrier gas to the sample gas generator, based on the gas supply pressure or the gas supply flow rate detected by the regulator. After the out of gas determination unit has determined that the out of gas has occurred in the gas supply source supplying the carrier gas to the sample gas generator, it is configured to perform a column protection operation for changing the gas supply source to the other of the gas supply sources fluidly connected to the sample gas generator by the switching unit.

Therefore, it is possible to protect the separation column without stopping the operation of the system, which makes it possible to quickly return to a state in which analysis can be performed.

EMBODIMENTS FOR CARRYING OUT THE INVENTION

Hereinafter, an example of a gas chromatograph will be described with reference to the attached drawings.

Figure 1:
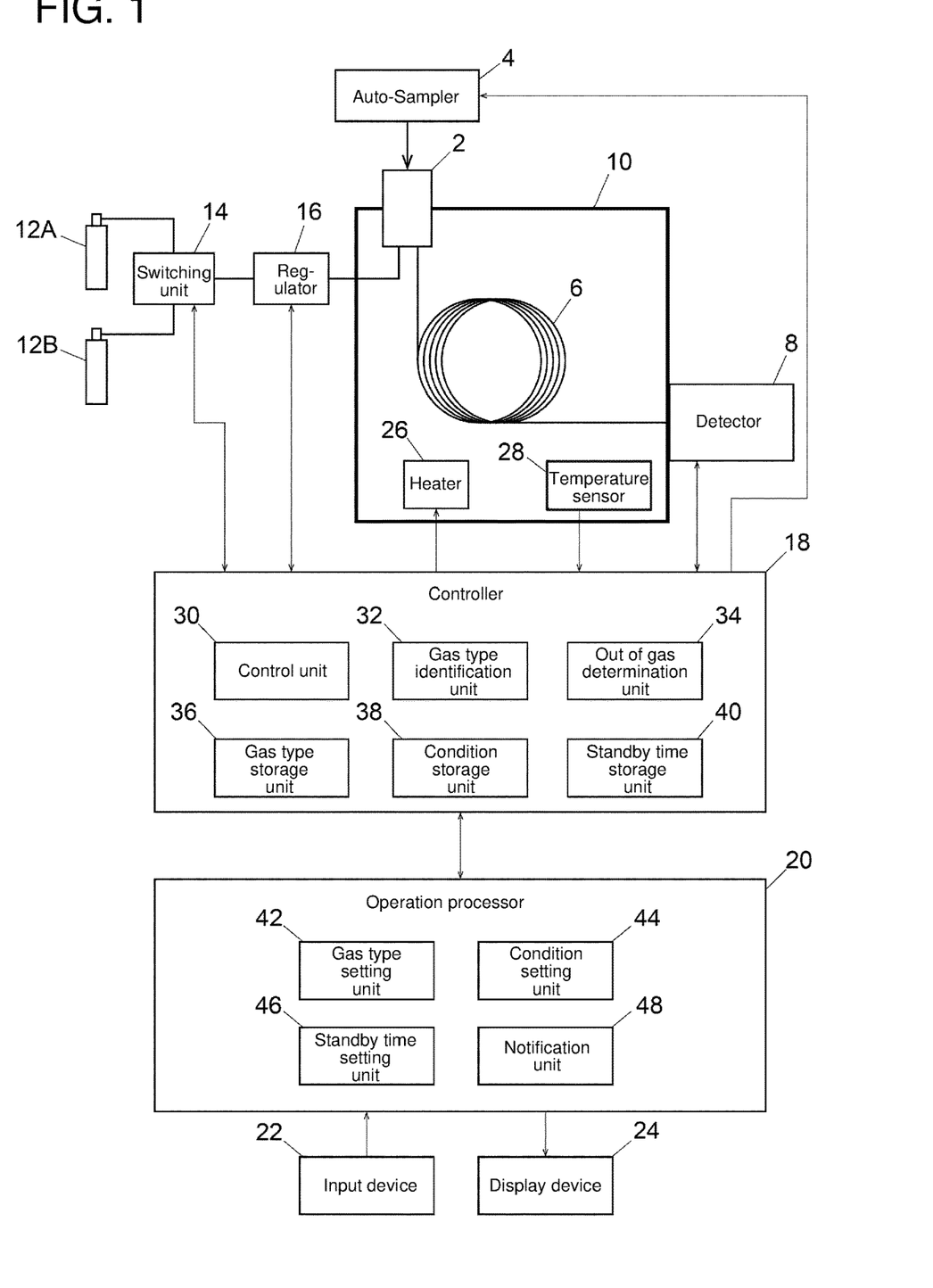
FIG. 1 is a schematic configuration diagram illustrating an example of a gas chromatograph.

As shown in FIG. 1, a gas chromatograph of this example is provided with a sample gas generator 2, an auto-sampler 4, a separation column 6, a detector 8, a column oven 10, gas supply sources 12A and 12B, a switching unit 14, a regulator 16, a controller 18, an operation processor 20, an input device 22, and a display device 24.

The auto-sampler 4 is configured to automatically inject a sample into the sample gas generator 2. The sample gas generator 2 is provided therein with a sample vaporization chamber for vaporizing a sample injected by the auto-sampler 4 to generate a sample gas. The inlet of the separation column 6 is fluidly connected to the outlet of the sample gas generator 2, and the detector 8 is fluidly connected to the outlet of the separation column 6. The separation column 6 is for separating the components in the sample gas generated by the sample gas generator 2, and the detector 8 is for detecting the respective components separated in the separation column 6. As the detector 8, an MS (mass spectrometer), a TCD (thermal conductivity detector), an FID (hydrogen flame ionization detector), etc., can be used.

A gas from one of the gas supply sources 12A and 12B is supplied to the sample vaporization chamber of the sample gas generator 2 as a carrier gas. The sample gas generated in the sample gas generator 2 is transferred to the separation column 6 by the carrier gas supplied from the gas supply source 12A or 12B. The switching unit 14 is configured to selectively fluidly connect either one of the gas supply sources 12A and 12B to the sample gas generator 2. The switching unit 14 may be implemented, for example, by a three-way solenoid valve. The regulator 16 is interposed between the switching unit 14 and the sample gas generator 2, and the flow rate of the gas supplied as a carrier gas to the sample gas generator 2 is regulated by the regulator 16. The regulator 16 has the function of regulating the supply pressure and the supply flow rate of the gas from the gas supply source 12A or 12B.

Note that in this example, one of the two gas supply sources 12A and 12B is selected by the switching unit 14, but the present invention is not limited thereto. It may be configured such that one of three or more gas supply sources may be selected by the switching unit 14.

The separation column 6 is accommodated within a column oven 10. The column oven 10 is provided with a heater 26 and a temperature sensor 28 to adjust the temperature of the separation column 6 to a set temperature.

The controller 18 is realized by electronic circuits (e.g., dedicated system controller) on which a CPU (Central Processing Units) and a storage device are mounted to control the operation of the gas chromatograph. The operation processor 20 is realized by a dedicated or general-purpose computer provided so as to be able to communicate with the controller 18. In the operation processor 20, it is possible to set the parameters required for the controller 18 to perform the operation control. Analysis data acquired by the detector 8 is inputted to the operation processor 20 via the controller 18, and the operation processor 20 is equipped with a function of performing various arithmetic processing based on the analysis data. The input device 22 realized by a keyboard or the like and the display device 24 realized by a liquid crystal display or the like are electrically connected to the operation processor 20. The information required for setting parameters, such as, e.g., analysis conditions, is inputted to the operation processor 20 via the input device 22. The result of the arithmetic processing executed by the operation processor 20 is displayed on the display device 24.

The controller 18 is provided with a control unit 30, a gas type identification unit 32, an out of gas determination unit 34, a gas type storage unit 36, a condition storage unit 38, and a standby time storage unit 40. The operation processor 20 is provided with a gas type setting unit 42, a condition setting unit 44, a standby time setting unit 46, and a notification unit 48. The control unit 30, the gas type identification unit 32, the out of gas determination unit 34, the gas type setting unit 42, the condition setting unit 44, the standby time setting unit 46, and the notification unit 48 are functions realized by executing predetermined programs by the CPU. The gas type storage unit 36, the condition storage unit 38, and the standby time storage unit 40 are functions realized by the storage area which is a part of the storage device.

The gas type of the carrier gas supplied from each of the gas supply sources 12A and 12B is determined by the type of the supplied gas of the gas cylinder to which the user connects each port of the switching unit 14. Therefore, there is a case in which the same type of gas is supplied, in addition to a case in which one of different types of gases is selectively supplied from the gas supply sources 12A and 12B. The gas type setting unit 42 of the operation processor 20 is configured to set the gas type of the carrier gas supplied from the gas supply source 12A, 12B by making the user input the type of supply gas from the gas cylinders connected to the respective ports of the switching unit 14. The information about the gas types of the respective gas supply sources 12A and 12B set by the gas type setting unit 42 is transmitted to the controller 18 and stored in the gas type storage unit 36. With this, the controller 18 recognizes the gas type of the carrier gas supplied from each of the gas supply sources 12A and 12B.

The gas type identification unit 32 of the controller 18 is configured to recognize the connection state between the ports in the switching unit 14 and identify the gas type of the carrier gas which is being supplied to the sample gas generator 2 based on the state of the switching unit 14 and the information stored in the gas type storage unit 36. The function of the gas type identification unit 32 enables the controller 18 to automatically recognize the gas type of the carrier gas.

In the gas chromatograph of this example, the gas type of the carrier gas can be set for a standby condition in a standby state in which no analysis is performed and for an analysis condition for sample analysis. The condition setting unit 44 of the operation processor 20 is configured to make the user input the gas type of the carrier gas as one of the respective parameters of the standby condition and the analysis condition to set the standby condition and the analysis condition. The standby condition and the analysis condition set by the condition setting unit 44 are transmitted to the controller 18 and held in the condition storage unit 38.

In a case where a gas supply source supplying the carrier gas to the sample gas generator 2 is switched, in particular in a case where the gas type of the carrier gas is changed thereby, it requires a certain standby time. That is, it is not possible to initiate the subsequent analysis until all of the gas in the carrier gas flow path, specifically, all of the gas in the flow path from the gas supply source 12A or 12B to the detector 8 via the sample gas generator 2 and the separation column 6, is replaced with the gas supplied after the switching. Therefore, a certain standby time is required.

In this example, it is configured such that a user can arbitrarily set the standby time from when the gas supply source is switched to when the standby state in which the subsequent sample analysis can be performed is established. The standby time setting unit 46 of the operation processor 20 is configured to set the standby time by having the user input an arbitrary numerical value. The standby time set by the standby time setting unit 46 is transmitted to the controller 18 and stored in the standby time storage unit 40. Note that the default value of the standby time may be stored in the standby time storage unit 40. In this case, the default value can be used as a standby time.

The control unit 30 is configured to perform the operation control of the auto-sampler 4, the detector 8, the switching unit 14, the regulator 16, and the heater 26, based on the standby conditions and the analysis conditions stored in the condition storage unit 38. In the standby state, the control unit 30 supplies the carrier gas of the set gas type to the sample gas generator 2 at the set supply pressure and flow rate and controls the temperature of the separation column 6 to the set temperature, in accordance with the standby conditions stored in the condition storage unit 38. Further, in the analysis state, in accordance with the analysis conditions stored in the condition storage unit 38, the control unit 30 supplies the carrier gas of the set gas type to the sample gas generator 2 at the set supply pressure and flow rate and controls the temperature of the separation column 6 to a set temperature. When shifting to the standby state in which the subsequent sample analysis can be performed, the controller controls the gas type of the carrier gas, the supply pressure and the flow rate of the carrier gas, and the temperature of the separation column 6 so as to bring the state of the gas chromatograph to the initial state of the subsequent sample analysis.

Note that since the viscosity differs depending on the gas type of the carrier gas, the relational expression for calculating the control quantity of the regulator 16 differs for each gas type of the carrier gas. Although not shown, in this example, the controller 18 stores the relational expression for each gas type of the carrier gas, and the relational expression corresponding to the gas type of the selected gas supply source 12A or 12B is used, thereby accurately controlling the regulator 16.

When the switching of the gas supply source has been performed to change to the standby state in which the subsequent sample analysis can be performed, the control unit 30 applies the standby time stored in the standby time storage unit 40 after switching the gas supply source.

The control unit 30 is configured to control the operation of the regulator 16 to perform the replacement promotion operation during the standby time. The replacement promotion operation is an operation for making the supply pressure or the flow rate of the carrier gas to a state different from the standby state in order to facilitate the replacement of the gas in the distribution flow path of the carrier gas.

Figure 5:
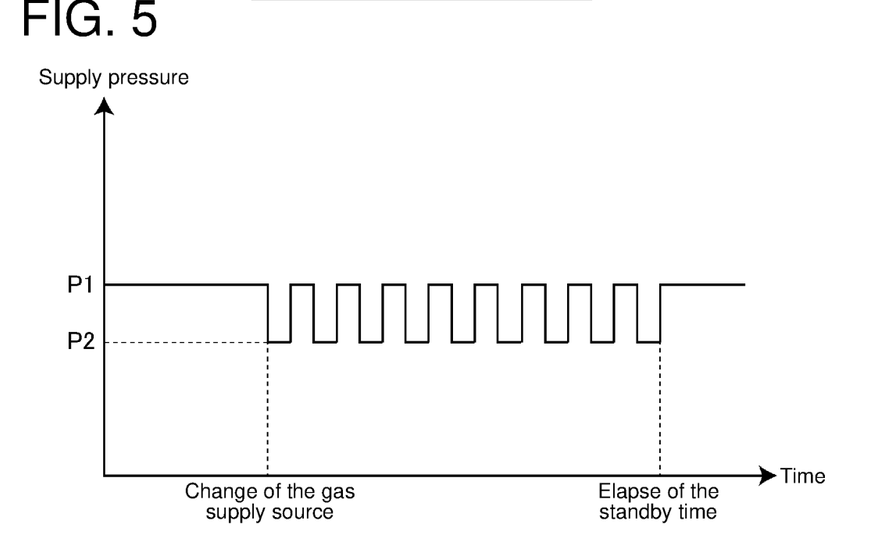
FIG. 5 is a time chart of a carrier gas supply pressure showing one example of a replacement promotion operation according to the example.

One example of the replacement promotion operation is to change the supply pressure of the carrier gas as shown in FIG. 5. As the replacement promotion operation, in place of or in addition to the gas supply pressure, the supply flow rate of the carrier gas may be changed.

The present inventors found that the reason why the replacement of the carrier gas in the distribution flow path takes a long time is due to the stagnation of the gas in the dead volume present in the distribution flow path of the carrier gas. The present inventors obtained a knowledge that when at least one of the supply pressure and the supply flow rate of the carrier gas is changed as shown in FIG. 5, the substitution of the gas stagnated in the dead volume is prompted by the turbulence generated in the distribution path, thereby improving the substitution efficiency of the gas.

In the example of FIG. 5, immediately after changing the gas type of the carrier gas, the supply pressure of the carrier gas is changed between P1 (e.g., 500 kPa) and P2 (e.g., 400 kPa) at regular cycles (at 10-second intervals to at 60-second intervals). Although when the carrier gas was constantly supplied under the initial condition of the analysis, it took about 2 hours for the replacement of the gas, it was confirmed that the replacement of the gas could be completed in about 15 minutes by performing such a replacement promotion operation. In this replacement promotion operation, it is not required to increase the flow rate of the carrier gas than that in the standby state. For this reason, by performing the replacement promotion operation, not only the shortening of the standby time can be attained, but also the reduction of the carrier gas consumption can be attained by the amount corresponding to the shortened standby time.

Figure 6:
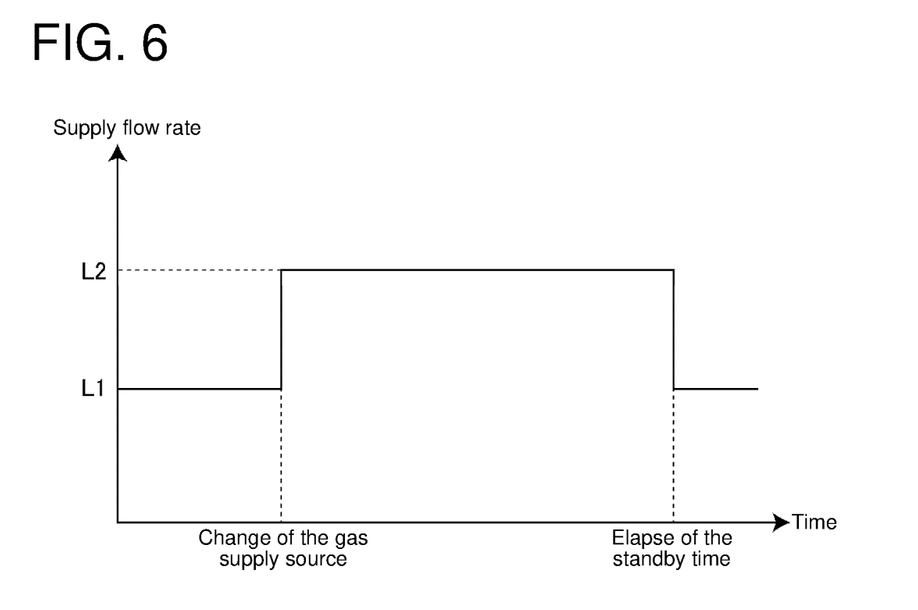
FIG. 6 is a time chart of a carrier gas supply flow rate showing another example of the replacement promotion operation according to the example.

Further, as another example of the replacement promotion operation, as shown in FIG. 6, an example in which the supply flow rate of the carrier gas in the standby time is increased than that in the initial state of the analysis. As described above, by making the supply flow rate of the carrier gas larger than that in the standby state, the replacement of the gas in the distribution flow path of the carrier gas is promoted, thereby shortening the standby time.

Figure 2:
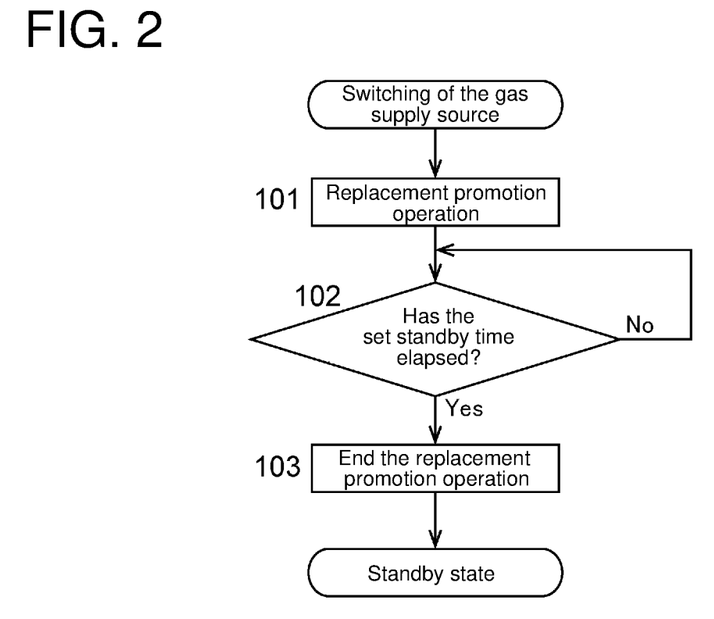
FIG. 2 is a flowchart showing one example of the operation at the time of switching a gas supply source according to the example.

With reference to the flowcharts of FIG. 2 and FIG. 1, an example of the operation at the time of switching the gas supply source will be described.

When the switching of the gas supply source is performed to transfer to the standby state in which analysis can be performed, the control unit 30 starts the replacement promotion operation (Step 101). When a standby time stored in the standby time storage unit 40 has elapsed since the gas supply source was switched, the replacement promotion operation is terminated (Steps 102 and 103). After completing the replacement promotion operation, it becomes a standby state when another analysis condition has been adjusted to the condition stored in the condition storage unit 38.

Figure 3:
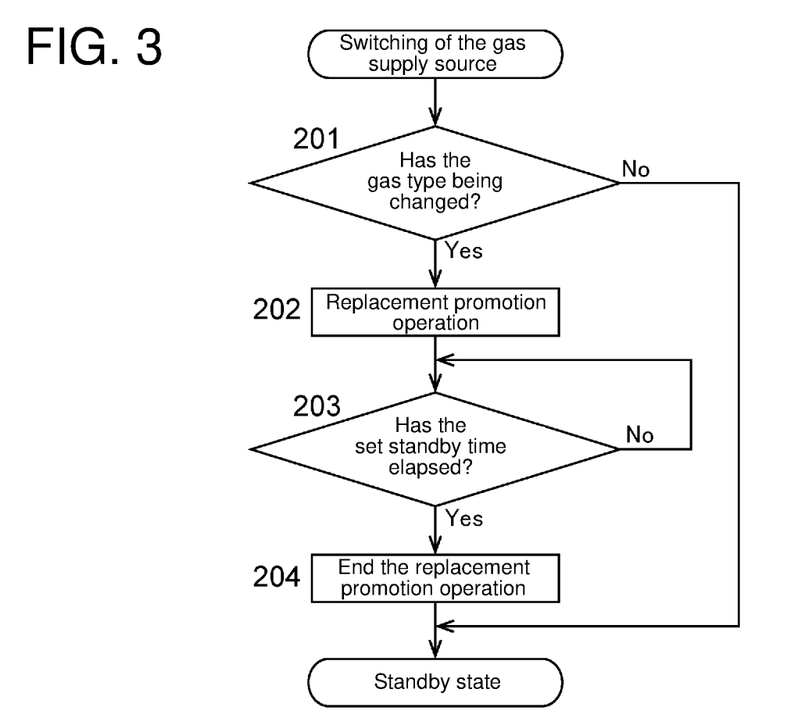
FIG. 3 is a flowchart showing another example of the operation at the time of switching the gas supply source according to the example.

Further, as shown in FIG. 3, when the gas supply source is switched, it may be configured such that the control unit 30 determines whether or not the gas type of the carrier gas has been changed (Step 201) based on the information stored in the gas type storage unit 36 and executes a replacement promotion operation only in a case where the gas type of carrier gas has been changed (Step 202). Also in this case, similarly to the operation shown in FIG. 2, the replacement promotion operation is continued until the preset standby time has elapsed (Step 203), and when the standby time has elapsed, the replacement promotion operation is terminated and becomes a standby state (Step 204).

After establishing the standby state, the control unit 30 may be configured to automatically perform the sample injection into the sample gas generator 2 by the auto-sampler 4 to initiate the analysis. Further, when the standby state is set, a notification indicating that the standby state has been established may be made to the user. The notification unit 48 of the operation processor 20 realizes the function of notifying the user. The notification to the user can be made by displaying on the display device 24, lighting of a predetermined lamp, a predetermined alarm sound or the like.

Note that it may be configured such that the user can set that an analysis is automatically initiated or a notification to the user is performed when a standby state has been established.

Returning to FIG. 1, the out of gas determination unit 34 of the controller 18 is configured to determine whether or not the out of gas of the gas supply source 12A or 12B supplying the carrier gas has occurred. The switching unit 14 or the regulator 16 constantly detects the gas supply pressure from the gas supply source 12A or 12B (in a minute-time period). When the remaining quantity of the gas supply source 12A or 12B supplying the carrier gas decrease, the gas supply pressure does not reach the set pressure even if the valve opening is increased so that the regulator 16 increases the gas supply pressure. The out of gas determination unit 34 determines that the out of gas of the gas supply source 12A or 12B currently supplying the carrier gas has occurred when a state in which the gas supply pressure is equal to or less than the preset threshold has continued for a predetermined time. The threshold for the out of gas determination is set based on a set value of a gas supply pressure. For example, the threshold can be set as follows: threshold=set value-$\alpha$ ($\alpha$ is a real number); threshold=set value×$\beta$ ($\beta$<1); etc.

Note that the out of gas determination unit 34 may be configured to determine the out of gas of the gas supply source 12A or 12B based on the supply flow rate of the carrier gas. The threshold for the out of gas determination is set based on the set value of the gas supply flow rate. For example, the threshold can be set as follows: threshold=set value-$\alpha$ ($\alpha$ is a real number); threshold=set value×$\beta$ ($\beta$<1); etc.

When it is determined by the out of gas determination unit 34 that the out of gas has occurred in the gas supply source 12A or 12B, the notification unit 48 notifies the user that the out of gas has occurred, and the column protection operation is performed. The column protection operation is an operation of switching the gas supply source by the switching unit 14 to prevent the interruption of the supplying of the carrier gas to the separation column 6 when the out of gas of the gas supply source is detected. Thus, by supplying the carrier gas with the other gas supply source when the gas supply source supplying the carrier gas runs out of gas, it is prevented that the separation column 6 is heated in a state in which no fluid is following through the separation column 6. The notification unit 48 notifies the user that the gas supply source has been switched by the column protection operation. The announcement can be made by displaying on the display device 24.

Note that, in this example, although the out of gas determination unit 34 is provided as a function of the controller 18, it may be configured such that the switching unit 14 is provided with a function of the out of gas determination unit 34 to detect the out of gas to thereby automatically perform the switching of the gas supply source. In such a case, the switching unit 14 transmits a signal indicating that the gas supply source has been switched due to the detection of the out of gas to the controller 18.

Figure 4:
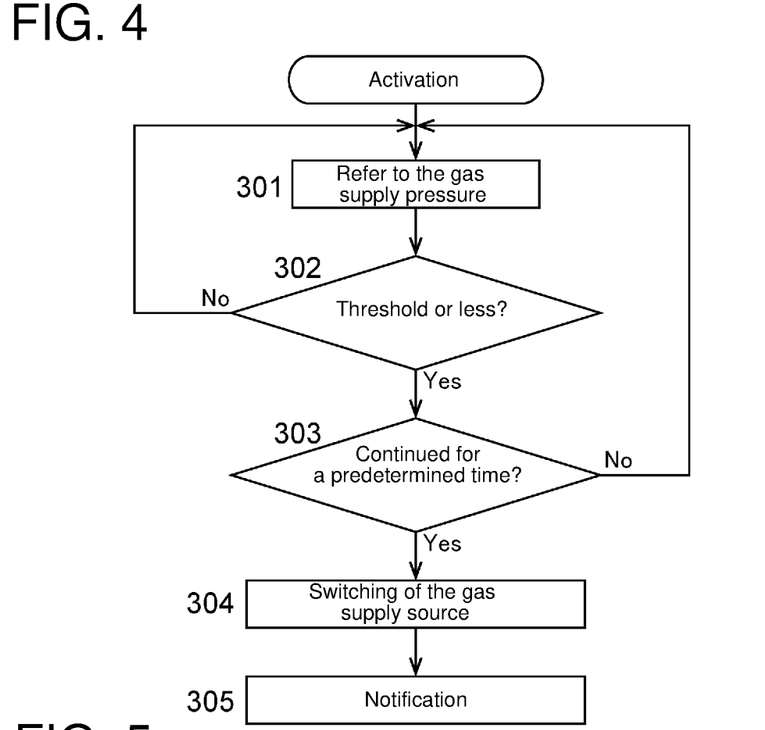
FIG. 4 is a flowchart showing one example of a column protection operation according to the example.

With reference to the flowchart shown in FIG. 4 together with FIG. 1, an example of the column protection operation will be described.

The out of gas determination unit 34 refers to the gas supply pressure at a constant period (Step 301) and compares the gas supply pressure with a preset threshold (Step 302). In a case where the gas supply pressure exceeds the threshold, it is normal (Step 302, no). On the other hand, in a case where the gas supply pressure is equal to or less than the threshold (Step 302, Yes), when the state has continued for a predetermined time (for a predetermined number of times) (Step 303, Yes), the out of gas determination unit 34 determines that the gas supply source 12A or 12B runs out of gas, and the switching unit 14 performs the switching of the gas supply source based on the determination result (Step 304).

In a case where the gas supply source has been switched based on the determination result of the out of gas determination unit 34, the notification unit 48 notifies the user that the gas supply source has been switched (Step 305). In addition, the notification unit 48 may be configured to display the type of the gas currently being supplied as a carrier gas on the display device 24 when the gas supply source has been switched. With such an announcement function, the user can easily recognize that the gas supply source has been switched.

The example described above is merely an example of the embodiment of the gas chromatograph according to the present invention, and the embodiment of the gas chromatograph according to the present invention is as follows.

A gas chromatograph according to an embodiment of the present invention is provided with:
- a sample gas generator configured to generate a sample gas from an injected sample;
- a separation column fluidly connected to an outlet of the sample gas generator, the separation column being configured to separate components in the sample gas generated by the sample gas generator;
- a detector fluidly connected to an outlet of the separation column, the detector being configured to detect the components separated in the separation column;
- a plurality of gas supply sources each configured to supply a carrier gas for carrying the sample gas generated by the sample gas generator to the separation column;
- a switching unit fluidly connected to the plurality of gas supply sources, the switching unit being configured to switch such that one of the plurality of gas supply sources is fluidly connected to the sample gas generator;
- a regulator interposed between the switching unit and the sample gas generator, the regulator being configured to regulate a gas supply pressure from the gas supply source and a gas supply flow rate to the sample gas generator; and
- an out of gas determination unit configured to determine whether or not out of gas has occurred in the gas supply source supplying the carrier gas to the sample gas generator, based on the gas supply pressure or the gas supply flow rate,
  wherein after the out of gas determination unit has determined that the out of gas has occurred in the gas supply source supplying the carrier gas to the sample gas generator, it is configured to perform a column protection operation for changing the gas supply source fluidly connected to the sample gas generator by the switching unit.

In the first aspect of the above-described embodiment, the out of gas determination unit is configured to determine that the out of gas has occurred when a state in which the gas supply pressure or the gas supply flow rate is equal to or less than a threshold set in advance has continued for a predetermined time.

In the above-described first aspect, the threshold is set based on a set value of the gas supply pressure or the gas supply flow rate.

In the above-described second aspect, the switching unit detects the gas supply pressure, and the out of gas determination unit is provided as a function of the switching unit, and the out of gas determination unit is provided as a function of the switching unit and is configured such that when determining that the out of gas has occurred in the gas supply source, the switching unit automatically changes the gas supply source fluidly connected to the sample gas generator.

In this aspect, the switching unit itself can automatically perform the column protection operation.

In the third aspect of the above-described embodiment, the gas chromatograph is further provided with:
a notification unit configured to notify a user of an occurrence of the out of gas when the out of gas determination unit has determined that the out of gas has occurred in the gas supply source.

In this aspect, the user can easily recognize the occurrence of the out of gas in the gas supply source.

In the above-described third aspect, the notification unit is configured to notify a user that when the column protection operation is performed, the gas supply source fluidly connected to the sample gas generator has been changed in accordance with the column protection operation.

This makes it easier for the user to recognize that the gas supply source has been changed.

Further, in the above-described third embodiment, the gas chromatograph is further provided with:
a gas type storage unit configured to store a type of a gas supplied from each of the plurality of gas supply sources connected to the switching unit; and
a gas type identification unit configured to recognize a state of the switching unit and identify the type of the carrier gas which is being supplied to the sample gas generator based on the state of the switching unit and information stored in the gas type storage unit,
wherein the notification unit is configured to notify the gas type of the carrier gas after the column protection operation is performed.

With this configuration, the user can easily recognize the gas type of the carrier gas after the gas supply source has been changed due to the out of gas, which in turn can prevent the analysis from being performed using the wrong carrier gas.

In the above-described case, the gas chromatograph may be further provided with:
a condition setting unit configured to set the gas type of the carrier gas as an analysis condition, based on information inputted by the user;
a condition storage unit configured to store an analysis condition set by the condition setting unit; and
a controller configured to control operations of the switching unit and the regulator based on the analysis condition stored in the condition storage unit.

With such a configuration, the user can set the gas type of the carrier gas used for the analysis as an analysis condition, and therefore, the analysis can be easily performed while changing the gas type of the carrier gas.

DESCRIPTION OF SYMBOLS

2: Sample gas generator
4: Auto-sampler
6: Separation column
8: Detector
10: Column oven
12A, 12B: Gas supply source
14: Switching unit
16: Regulator
18: Controller
20: Operation processor
22: Input device
24: Display device
26: Heater
28: Temperature sensor
30: Control unit
32: Gas type identification unit
34: Out of gas determination unit
36: Gas type storage unit
38: Condition storage unit
40: Standby time storage unit
42: Gas type setting unit
44: Condition setting unit
46: Standby time setting unit
48: Notification unit

The invention claimed is:

1. A gas chromatograph comprising: a sample gas generator configured to generate a sample gas from an injected sample;
a separation column fluidly connected to an outlet of the sample gas generator, the separation column being configured to separate components in the sample gas generated by the sample gas generator;
a detector fluidly connected to an outlet of the separation column, the detector being configured to detect the components separated in the separation column;
a plurality of gas supply sources each configured to supply a carrier gas for carrying the sample gas generated by the sample gas generator to the separation column;
a switching unit fluidly connected to the plurality of gas supply sources, the switching unit being configured to switch such that one of the plurality of gas supply sources is fluidly connected to the sample gas generator;
a regulator interposed between the switching unit and the sample gas generator, the regulator being configured to regulate a gas supply pressure from the gas supply source and a gas supply flow rate to the sample gas generator; and
an out-of-gas determination unit configured to determine whether or not out of gas has occurred in the gas supply source supplying the carrier gas to the sample gas generator, based on the gas supply pressure or the gas supply flow rate,
wherein after the out-of-gas determination unit has determined that the out of gas has occurred in the gas supply source supplying the carrier gas to the sample gas generator, it is configured to perform a column protection operation for changing the gas supply source fluidly connected to the sample gas generator by the switching unit.

2. The gas chromatograph as recited in claim 1, wherein the out-of-gas determination unit is configured to determine that the out of gas has occurred when a state in which the gas supply pressure or the gas supply flow rate is equal to or less than a threshold set in advance has continued for a predetermined time.

3. The gas chromatograph as recited in claim 2, wherein the threshold is set based on a set value of the gas supply pressure or the gas supply flow rate.

4. The gas chromatograph as recited in claim 1, wherein the switching unit detects the gas supply pressure, and wherein the out-of-gas determination unit is provided as a function of the switching unit and is configured such that when determining that the out of gas has occurred in the gas supply source, the switching unit automatically changes the gas supply source fluidly connected to the sample gas generator.

5. The gas chromatograph as recited in claim 1, further comprising: a notification unit configured to notify a user of an occurrence of the out of gas when the out-of-gas determination unit has determined that the out of gas has occurred in the gas supply source.

6. The gas chromatograph as recited in claim 5, wherein the notification unit is configured to notify a user that when the column protection operation is performed, the gas supply source fluidly connected to the sample gas generator has been changed in accordance with the column protection operation.

7. The gas chromatograph as recited in claim 5, further comprising:
a gas type storage unit configured to store a type of a gas supplied from each of the plurality of gas supply sources connected to the switching unit; and
a gas type identification unit configured to recognize a state of the switching unit and identify the type of the carrier gas which is being supplied to the sample gas generator based on the state of the switching unit and information stored in the gas type storage unit,
wherein the notification unit is configured to notify the user of the gas type of the carrier gas after the column protection operation is performed.

8. The gas chromatograph as recited in claim 6, further comprising:
a condition setting unit configured to set the gas type of the carrier gas as an analysis condition, based on information inputted by the user;
a condition storage unit configured to store an analysis condition set by the condition setting unit; and
a controller configured to control operations of the switching unit and the regulator based on the analysis condition stored in the condition storage unit.

\* \* \* \* \*